United States Patent
Shevchenko et al.

(10) Patent No.: US 11,072,533 B2
(45) Date of Patent: Jul. 27, 2021

(54) MANUFACTURE OF TUNGSTEN MONOCARBIDE (WC) SPHERICAL POWDER

(71) Applicant: Höganäs AB (Publ), Höganäs (SE)

(72) Inventors: Ruslan Alekseevich Shevchenko, Moscow (RU); Alexander Yurievich Vakhrushin, Moscow (RU); Andrey Pavlovich Chukanov, Moscow (RU)

(73) Assignee: HÖGANÄS AB (PUBL), Höganäs (SE)

( * ) Notice: Subject to any disclaimer, the term of this patent is extended or adjusted under 35 U.S.C. 154(b) by 135 days.

(21) Appl. No.: 16/318,974

(22) PCT Filed: Jul. 21, 2017

(86) PCT No.: PCT/EP2017/068505
§ 371 (c)(1),
(2) Date: Jan. 18, 2019

(87) PCT Pub. No.: WO2018/015547
PCT Pub. Date: Jan. 25, 2018

(65) Prior Publication Data
US 2019/0300374 A1    Oct. 3, 2019

(30) Foreign Application Priority Data

Jul. 21, 2016 (RU) .......................... RU2016129969

(51) Int. Cl.
  *C01B 32/949* (2017.01)
  *B22F 9/00* (2006.01)
  *B22F 9/08* (2006.01)
  *C22C 29/08* (2006.01)
  *B22F 9/10* (2006.01)

(52) U.S. Cl.
  CPC .............. *C01B 32/949* (2017.08); *B22F 9/00* (2013.01); *B22F 9/082* (2013.01); *B22F 9/10* (2013.01); *C22C 29/08* (2013.01); *B22F 2009/0848* (2013.01); *C01P 2002/60* (2013.01); *C01P 2002/72* (2013.01); *C01P 2004/32* (2013.01); *C01P 2004/61* (2013.01); *C01P 2004/80* (2013.01)

(58) Field of Classification Search
CPC .... B22F 9/00; B22F 9/10; B22F 9/082; B22F 2009/0848; C01B 32/949; C01B 31/34; C01P 2004/32; C01P 2004/61; C01P 2004/80; C01P 2002/72; C01P 2002/60; B01J 2/04; B01J 2/18; C22C 29/08
USPC ................ 423/439, 440; 264/8, 9, 10; 425/8
See application file for complete search history.

(56) References Cited

U.S. PATENT DOCUMENTS

| 5,089,182 A | 2/1992 | Findeisen et al. |
| 8,784,706 B2 * | 7/2014 | Shevchenko ......... C01B 32/949 264/8 |
| 9,079,778 B2 | 7/2015 | Kelley et al. |
| 2013/0134613 A1 * | 5/2013 | Shevchenko .............. B01J 2/18 264/8 |

FOREIGN PATENT DOCUMENTS

| EP | 0687650 A1 | 12/1995 |
| RU | 2349424 C1 | 3/2009 |
| WO | 2011144668 A1 | 11/2011 |

OTHER PUBLICATIONS

International Search Report and Written Opinion issued in corresponding International Patent Application No. PCT/EP2017/068505, 11 pages, Nov. 22, 2017.
Unknown, "Specifications for Spherical Cast Tungsten Carbide (YZDF)," TTI Metals: Sourcing. Engineering. Logistics., http://www.ttimetals.com/spherical-tungsten-carbide/, Oct. 3, 2017, 2 pages.
Unknown, "Material Product Data Sheet: Spherical Cast Tungsten Carbide Powder for Laser Cladding," OERLIKON METCO, https://www.oerlikon.com/ecomaXL/files/metco/oerlikon_DSMW-0015.2_WC.pdf&download=1, Oct. 3, 2017, 2 pages.
Demirskyi, Dmytro, et al., "Peculiarities of the neck growth process during initial stage of spark-plasma, microwave and conventional sintering of WC spheres," Journal of Alloys and Compounds, Elsevier Sequioa, Lausanne, CH, vol. 523, Jan. 27, 2012, pp. 1-10.

* cited by examiner

*Primary Examiner* — Elizabeth D Wood
(74) *Attorney, Agent, or Firm* — Buchanan Ingersoll & Rooney P.C.

(57) ABSTRACT

Powder metallurgy, in particular production of tungsten monocarbide spherical powders, which is a major component of metalloceramic hard alloys used for manufacture of tools, drill bits, steel alloying, wear-resistant coating cladding at elements operating in intensive wear conditions. The method includes melting of the starting material, and melt atomization with forming of spherical powder. As starting material a tungsten monocarbide grit is used. Melting and atomization of the material is implemented by continuous filling of grit into a rotating crucible of a centrifugal atomization device under an inert atmosphere and melting it by a plasma arc. After that an annealing of the obtained powder is made at a temperature of 1200-1400° C. during a time necessary for $W_2C$ breakup with subsequent cooling of the powder in a furnace. And, the production of tungsten monocarbide spherical powder with WC content of more than 70%.

5 Claims, 3 Drawing Sheets

MANUFACTURE OF TUNGSTEN MONOCARBIDE (WC) SPHERICAL POWDER

TECHNICAL FIELD

The invention is concerned with powder metallurgy, in particular with production of tungsten monocarbide spherical powders, which is a major component of metalloceramic hard alloys used for manufacture of tools, drill bits, steel alloying, wear-resistant coating cladding of elements operating in intensive wear conditions. Both the manufacturing method as well as the produced powder are disclosed.

BACKGROUND

Tungsten monocarbide is produced from tungsten or its compounds such as, for example oxide or acid by its contact with carbon or carbon content materials. There is known, for example the synthesis method of tungsten monocarbide powder wherein the powders of tungsten and carbon are exposed to intensive mechanical treatment and annealing (A. S. Kurlov and A. I. Gusev "*Effect of ball milling parameters on the particle size in nanocrystalline powders*", Pis'ma v Zhurnal Tekhnicheskoĭ Fiziki. 2007; 33(19):46-54. English Translation: Tech. Phys. Lett. 2007; 33(10):828-832)

There is also known a powder production method based on tungsten monocarbide wherein a reduction in a plasma reactor of tungsten oxygen content compounds by hydrocarbons is made using electric discharge plasma with production of mixed powders from WC, $W_2C$, tungsten and free carbon and subsequent treatment of mixture into hydrogen atmosphere at temperature 800-1300° C. for reduction of carbides and removing of oxygen for production of powder on the tungsten monocarbide base (RU 2349424). Tungsten monocarbide produced by above technologies is formed as a powder with irregular shape of particles. Thus it is not spherical powder.

However, for many applications it is necessary to use a powder with spherical shape of particles. The structure of spherical grains is characterized by high density and practical absence of defects (except for crushed powder), because of this a higher strength of spherical particles is obtained.

Spherical powder of most materials is produced according to the state of the art, basically by melt atomization using various methods, such as gas stream atomization, centrifugal atomization, plasma spheroidization etc. There is known a method of tungsten carbide spherical powder production wherein non spherical particles of WC are coated by a carbon compound, than heated by plasma before spherical powder formation (U.S. Pat. No. 9,079,778). Also, there is known a method of tungsten carbide spherical powder production wherein the melting of tungsten carbide initial material is performed at a temperature 150-300° C. higher than its melting point, melt hold up and atomization by inert gas stream (U.S. Pat. No. 5,089,182).

However, to obtain tungsten monocarbide powder with spherical shape of particles is impossible due to the decomposition of tungsten monocarbide during heating by a peritectically reaction at temperature 2500° C. to $W_2C$ and free carbon (C). After subsequent melt cooling in hard material structure the phases in accordance with the state diagram are fixed, namely $W_2C$, WC, C. To obtain a powder with a usable content of spherical tungsten monocarbide by atomization of a melt defined composition is impossible according to the state of the art.

SUMMARY OF THE INVENTION

It is an object of the invention to alleviate at least some of the problems in the prior art and to provide production method for tungsten monocarbide spherical powder.

One of the technical results of the invention is an increase of the tungsten monocarbide content in the final product to more than 70 vol %.

The technical result is achieved by the following: in the production method of tungsten monocarbide spherical powder there is included melt atomization with spherical powder formation in accordance with the invention. As starting material a grit of tungsten monocarbide is used, melting and atomization of the starting material is made by continuously filling of grit into a rotating crucible of a centrifugal atomization device under an inert atmosphere and grit melting by plasma arc is implemented. After that the annealing of powder is made at a temperature of 1200-1400° C. during a time necessary for $W_2C$ breakup and subsequent cooling of powder in a furnace.

As a result of the claimed method a powder with a particle size from 10 μm to 2.5 mm is obtained.

DETAILED DESCRIPTION

Figure 1:
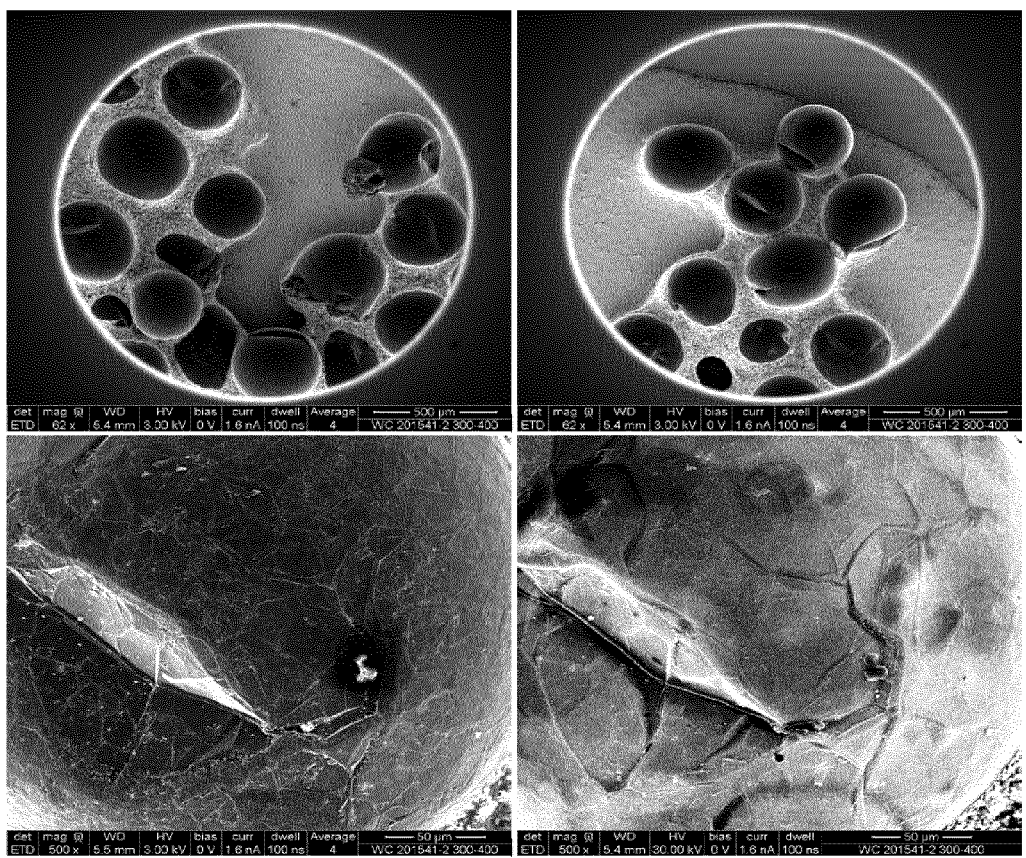
FIG. 1 presents an electron micrograph of tungsten monocarbide spherical powder (a) and a cross section of particles after etching (b).
Figure 1:
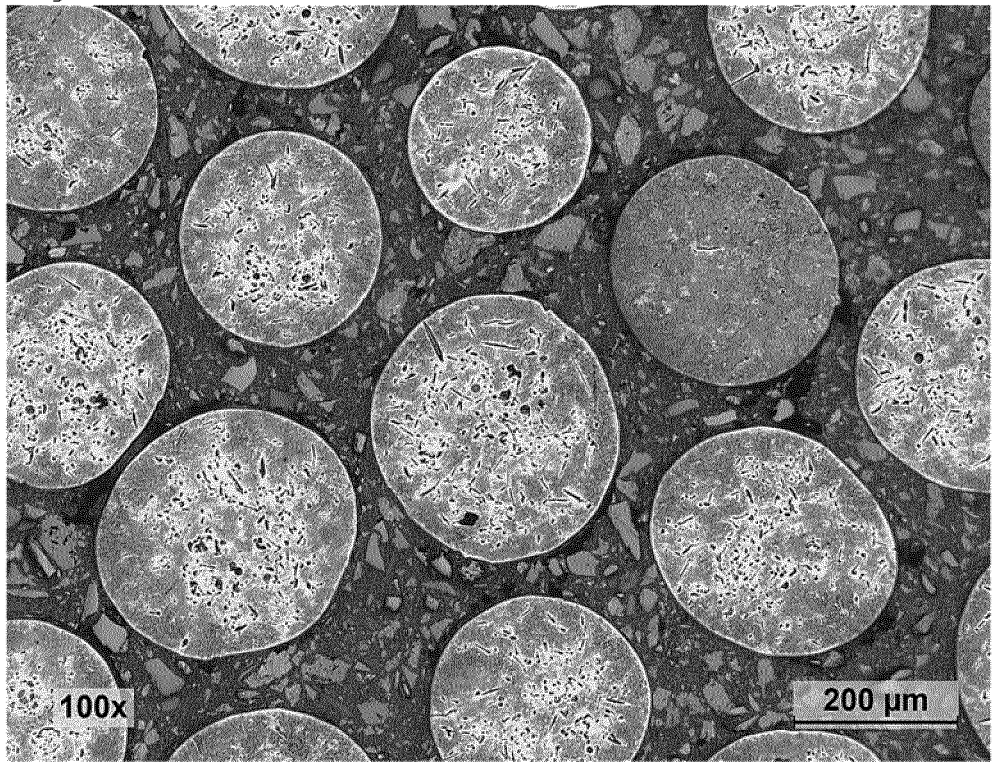

In accordance with the state diagram, the tungsten monocarbide is formed by a peritectic reaction at a temperature ~2500° C. At a temperature of complete melting (2870° C.) the tungsten monocarbide is disintegrated to $W_2C$ and carbon. During melt crystallization under the atomization process the phases of WC, $W_2C$ and free carbon are formed. Hereby, spherical powder obtained during melt atomization is a mixture of the above described phases. Annealing of the obtained atomized powder mixture allows transforming it into an equilibrium state. Thereby the phase $W_2C$ in the particles transforms to phase WC. Herewith the choice of modes and conditions of cooling allows to obtain desired properties. It is experimentally determined that the annealing treatment of atomized spherical powder at temperature 1200-1400° C. with a holding time necessary for $W_2C$ decomposition is suitable. The subsequent slow cooling of the powder in a furnace allows to obtain a spherical powder with a tungsten monocarbide content of more than 70 vol %. The best results for the annealing of the powder is observed for annealing times of 1.5-2 hours at 1200-1400° C.

In a first aspect there is provided a production method for the manufacture of tungsten monocarbide (WC) spherical powder, said method comprising the steps of: initial melting of a starting material, and subsequent melt atomization with forming of spherical powder wherein a grit of tungsten monocarbide is used as the starting material, melting and atomization of the starting material is performed by continuous filling of grit into a rotating crucible of a centrifugal atomization device under an inert atmosphere and melting by plasma arc to form a powder, after that an annealing of the powder is made at a temperature of 1200-1400° C. during a time necessary for $W_2C$ breakup and subsequent cooling of the powder in a furnace.

In one embodiment the starting material is a grit of tungsten monocarbide WC with a particle size in the interval 20-80 μm. Particle size is defined as the largest possible distance between any two points on the surface of the particle. For a spherical particle the particle size corresponds to the diameter.

In one embodiment the annealing of the obtained powder is performed during 1.5-2 hours. A skilled person can determine a suitable time for decomposition of $W_2C$ by routine experimentation in the light of this description. A suitable value is often in the interval 1.5-2 hours.

In one embodiment a powder with particle size from 10 μm to 2.5 mm is produced. The particles size is measured on individual particles of the powder.

In one embodiment the inert atmosphere comprises at least one gas selected from the group consisting of nitrogen, argon, and helium. In one embodiment the inert atmosphere is nitrogen. In one embodiment the inert atmosphere is argon. In one embodiment the inert atmosphere is helium. In one embodiment the inert atmosphere is at least one noble gas. In one embodiment the inert atmosphere is at least one inert gas.

In a second aspect there is provided a tungsten monocarbide spherical powder with a particle size from 10 μm to 2.5 mm and which is produced by the method as described above.

In one embodiment the WC content is more than 70 vol %, i.e. the content of tungsten monocarbide.

EXAMPLES

Initial powder (starting material) of tungsten monocarbide with irregular shape particles (the grit) was atomized in a centrifugal atomization device from a rotating scull crucible.

Grit melting is implemented directly in the rotating crucible using plasma arc heat burned between the plasmatron and the surface of the rotating crucible. Initial grit was continuously filled in the crucible.

In order to study the influence of the gas atmosphere in the work chamber on the size of particles on its properties, the atomization under argon, helium and nitrogen were conducted under atmospheric pressure. Depending on atomization modes a spherical powder with a particle size from 10 μm to 2.5 mm was obtained.

In all cases, the particles of obtained powder have spherical shape, see also FIG. 1.

Figure 2:
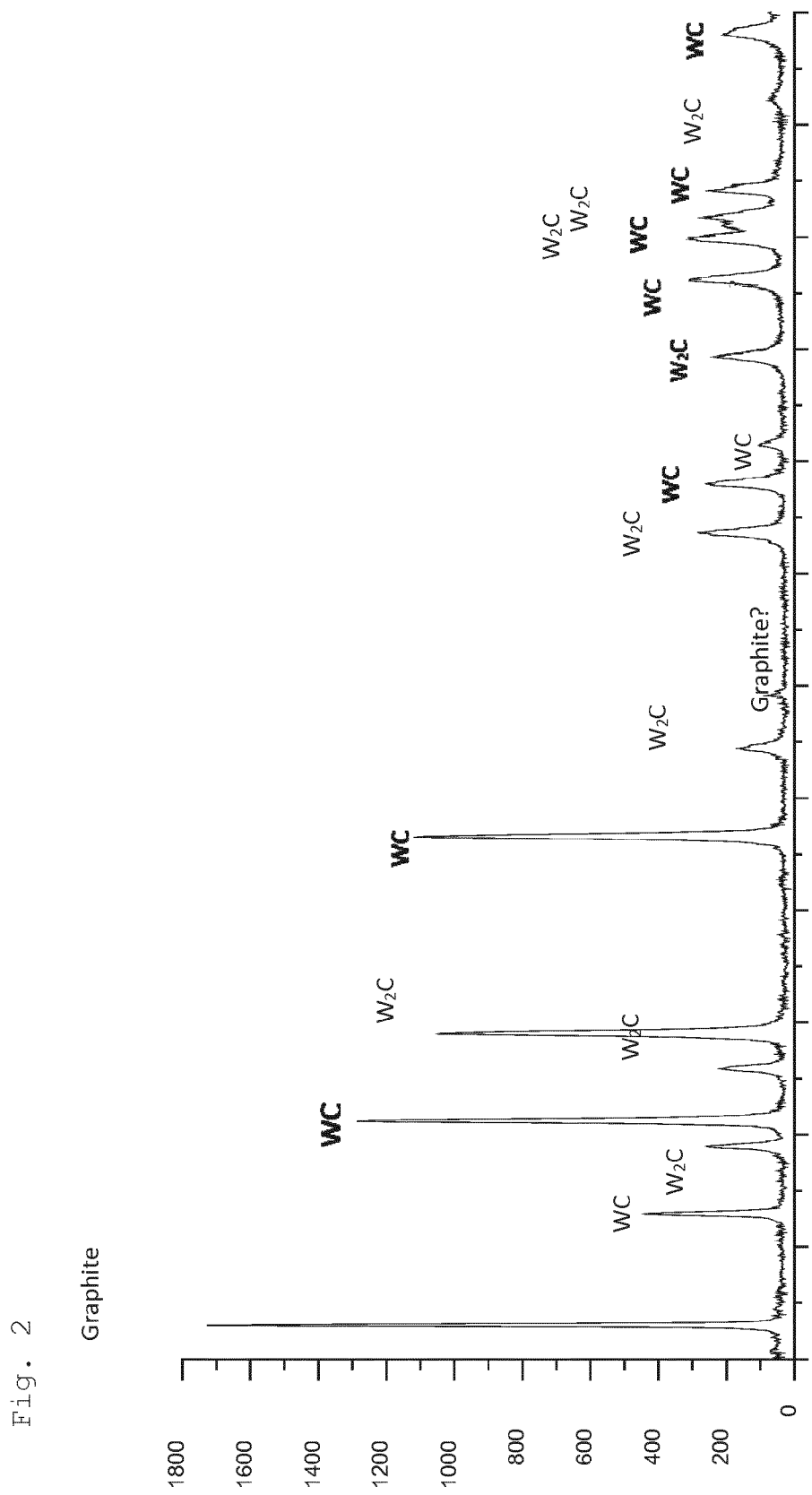
FIG. 2 presents a typical radiograph of tungsten monocarbide spherical powder directly after atomization.

Independent of the particle size and atomization conditions the phase composition of atomized material is identical and represent a mixture of particles with following phases: WC (~31-35 vol %.), $W_2C$ (~42-58 vol %.), C (~10-23 vol %.), FIG. 2, table 1.

Annealing of obtained spherical powder at temperatures more than 1200° C. with different time of hold up were conducted.

Figure 3:
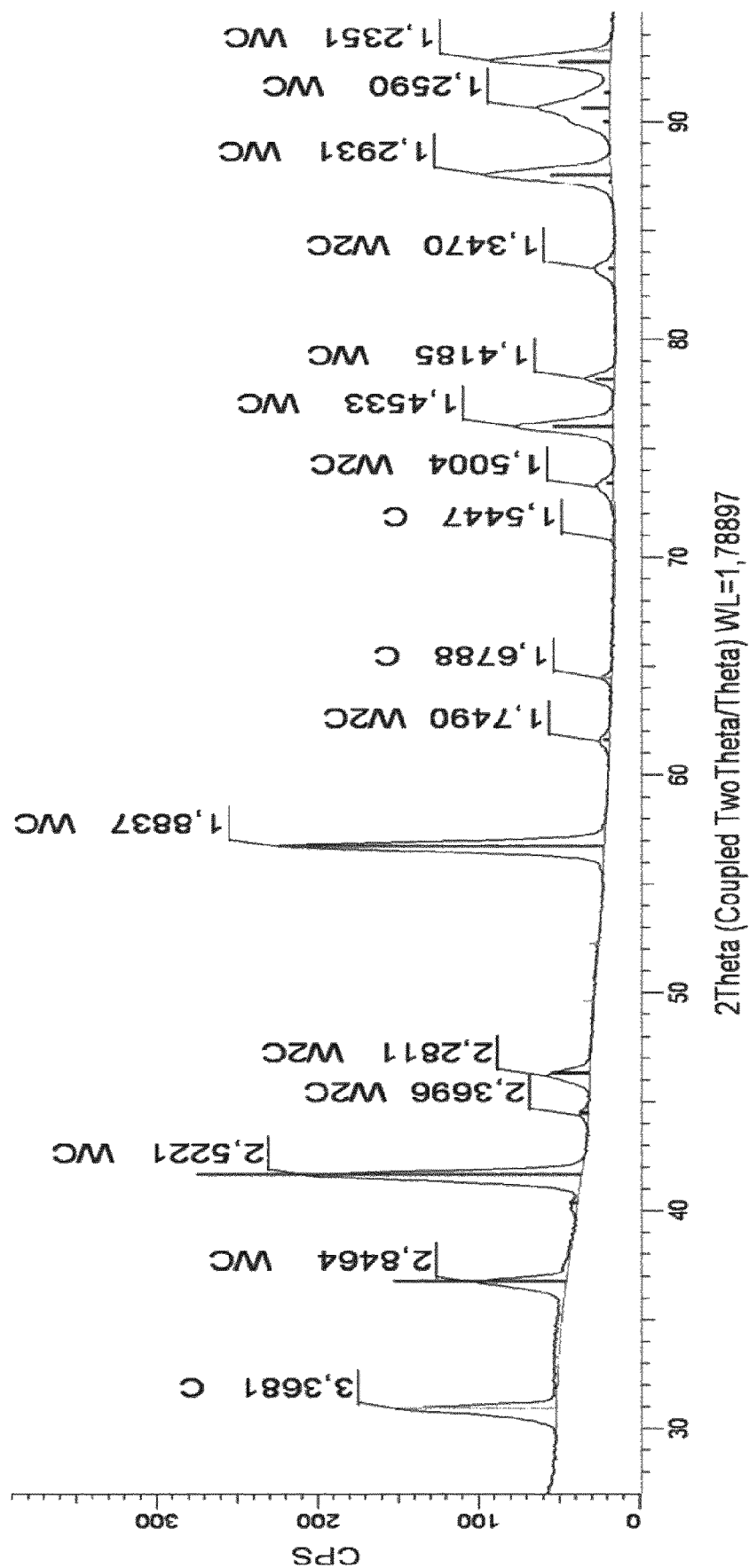
FIG. 3 presents a typical radiograph of tungsten monocarbide spherical powder after annealing.

Table 1 shows the phase ratio in spherical powder material depending on atomization conditions and thermal treatment modes. FIG. 3 shows a typical diagram of tungsten monocarbide spherical powder after annealing.

In all cases regarding the structure of powder material, the change of material phase composition after thermal treatment is observed in comparison to material phase composition directly after atomization.

Depending on thermal treatment modes, $W_2C$ phase content is decreased sufficiently and it disappears practically. $W_2C$ phase content at the most effective treatment modes is not more than 0.5 vol % or even lower. This content is so low that it has no practical importance for most applications and thus it can be said that the $W_2C$ has disappeared.

Thereby, the suggested technical solution provides practically pure tungsten monocarbide in form of atomized powder with spherical shape of particles. For most practical applications the tungsten monocarbide can be considered as sufficiently pure.

TABLE 1

Phase composition of tungsten monocarbide spherical powder directly after atomization and after thermal treatments.

| Material No | condition | Size of particles, μm | Atomization conditions | Thermal treatment at T ° C. | Content of phases, vol %. | | |
|---|---|---|---|---|---|---|---|
| | | | | | WC | $W_2C$ | C |
| 1 | Initial grit | 20-80 | | | 100 | | |
| 2 | Spherical | 15-42 | nitrogen | | 31 | 57 | 12 |
| 3 | powder | 400-630 | | | 34 | 56 | 10 |
| 4 | directly | 1600-2000 | | | 32 | 58 | 10 |
| 5 | after | 125-200 | argon | | 35 | 42 | 23 |
| 6 | atomization | 800-1000 | | | 31 | 48 | 21 |
| 7 | | 15-42 | helium | | 35 | 55 | 10 |
| 8 | | 125-200 | | | 32 | 54 | 14 |
| 9 | | 400-630 | | | 35 | 45 | 20 |
| 10 | Spherical powder | 15-42 | nitrogen | 1200° C.-5 h | 70.2 | 2.8 | 27 |
| 11 | after atomization | 15-42 | | 1350° C.-4 h | 70.5 | 1.4 | 28.1 |
| 12 | and thermal treatment | 400-630 | | 1400° C.-3 h | 97.6 | 0.7 | 1.7 |
| 13 | | 1600-2000 | | 1350° C.-4 h | 70.1 | 2.9 | 27 |
| 14 | | 125-200 | argon | 1350° C.-7 h | 81 | 0.6 | 18.4 |
| 15 | | 800-1000 | | 1400° C.-4 h | 94 | 0.5 | 5.5 |
| 16 | | 15-42 | helium | 1350° C.-4 h | 70.4 | 1.2 | 28.4 |
| 17 | | 125-200 | | 1400° C.-4 h | 93 | 0.4 | 6.6 |
| 18 | | 400-630 | | 1250° C.-6 h | 86 | 2.2 | 11.8 |

The invention claimed is:

1. A method for the manufacture of tungsten monocarbide (WC) spherical powder said method comprising the steps of:
   initial melting of a starting material, and subsequent melt atomization with forming of spherical powder
   wherein a grit of tungsten monocarbide is used as the starting material, melting and atomization of the starting material is performed by continuous filling of grit into a rotating crucible of a centrifugal atomization device under an inert atmosphere and melting by plasma arc to form a powder comprising WC, $W_2C$, and C, and after that an annealing of the powder is made at a temperature of 1200-1400° C. during a time necessary for $W_2C$ breakup and subsequent cooling of the powder in a furnace.

2. The method according to claim 1, wherein the starting material is a grit of tungsten monocarbide WC with a particle size in the interval 20-80 μm.

3. The method according to claim 1, wherein the annealing of the obtained powder is performed during 1.5-2 hours.

4. The method according to claim 1, wherein a powder with particle size from 10 μm to 2.5 mm is produced.

5. The method according to claim 1, wherein the inert atmosphere comprises at least one gas selected from the group consisting of nitrogen, argon, and helium.

\* \* \* \* \*